United States Patent [19]
Kopf et al.

[11] 3,803,616
[45] Apr. 9, 1974

[54] SUB-SURFACE RADIO SURFACE WAVE LAUNCHER

[75] Inventors: Eugene H. Kopf, Sunnyvale; Arthur F. Wickersham, Menlo Park, both of Calif.

[73] Assignee: Stanford Research Institute, Menlo Park, Calif.

[22] Filed: Nov. 20, 1972

[21] Appl. No.: 307,956

Related U.S. Application Data
[63] Continuation of Ser. No. 124,749, March 16, 1971, abandoned.

[52] U.S. Cl. .............................. 343/719, 343/753
[51] Int. Cl. ............................................. H01q 1/04
[58] Field of Search .............. 343/719, 753, 911

[56] References Cited
UNITED STATES PATENTS
3,346,864  10/1967  Harmon .......................... 343/719
2,638,588  5/1953  Riblet ............................... 343/719
3,435,457  3/1969  Brueckmann ..................... 343/719

FOREIGN PATENTS OR APPLICATIONS
688,374  3/1953  Great Britain ..................... 343/785

*Primary Examiner*—Eli Lieberman
*Attorney, Agent, or Firm*—Lindenberg, Freilich & Wasserman

[57] ABSTRACT

A large increase in the signal strength of the surface wave transmitted from a buried or sub-surface antenna is achieved by shaping the interface region, at which the sub-surface wave is directed, into a cylindrical or spherical lens.

3 Claims, 6 Drawing Figures

3,803,616

SUB-SURFACE RADIO SURFACE WAVE LAUNCHER

This application is a continuation of application Ser. No. 124,749, filed Mar. 16, 1971, now abandoned, for "Sub-Surface Radio Surface Wave Launcher," by Kopf, et al.

BACKGROUND OF THE INVENTION

This invention relates to an improved means for generating a radio surface wave on the surface of the earth.

A surface wave is a radio wave which does not spread out into space but which is confined to and guided along the earth's surface. The amplitude of a surface wave decays exponentially in directions perpendicular to the surface and may have either a component of the electrical or magnetic vectors in the direction of propagation. If it is the electric vector that has a component in the direction of propagation, the wave is said to be a transverse magnetic (TM) mode and if it is the magnetic vector, it is called a transverse electric (TE) mode. The TM mode is of concern here.

One of the ways of generating radio surface waves heretofore, has been to bury a source such as an antenna in the earth. Radio waves emitted by the source may either propagate down into the earth, be internally and totally reflected at the interface, or refracted and propagate upward into the atmosphere. One ray which separates the class of totally reflected and the class of refracted rays, emerges at a grazing angle and propagates parallel to the interface. The angle of incidence that this ray makes with the interface is called the critical angle. As the ray propagates tangentially to the interface, it continually sheds rays down into the lower medium and eventually one such ray can be intercepted by a receiver buried in the lower medium. The interface is the boundary between the earth and the atmosphere.

Heretofore, the technique for optimizing the surface wave has been to point the maximum of the radiation pattern of a buried dipole in the direction of the critical angle. This has not proved very satisfactory. Actual measurements made, using this technique, reveal that less than a 100th of the energy radiated by such antennas is available as a surface wave.

Using a high-gain, subterranian antenna is practically difficult and does not greatly improve efficiency for generating a lateral surface wave. The use of a high gain antenna implies that the surface of the interface in the region of the emergence of the beam must be increasingly accurate as a plane, homogeneous interface, and this in turn implies that the cone of rays incident at the critical angle will remain, in a practical sense, infinitesimal. The small portion of energy contained within the infinitesimal cone continues to make the system inefficient.

OBJECTS AND SUMMARY OF THE INVENTION

It is an object of this invention to provide a subterranean surface wave launching system that is more efficient than those devised heretofore.

It is another object of the present invention to provide a surface wave launching system in which the magnitude of the surface wave which is radiated, relative to a given amount of excitation applied to the radiation source, is greater than has been attained heretofore.

Yet another object of the present invention is to provide a simple and improved arrangement for launching surface waves.

These and other objects of the invention may be achieved by shaping the interface region of the earth at which the maximum of the radiation pattern of the antenna used as a source is directed, into a cylindrical or spherical lens which has a high dielectric constant and thus provides a small aperture, smaller than a wavelength, in air. As a result the lens directs a large angular sector of the radiation from the antenna along the surface.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
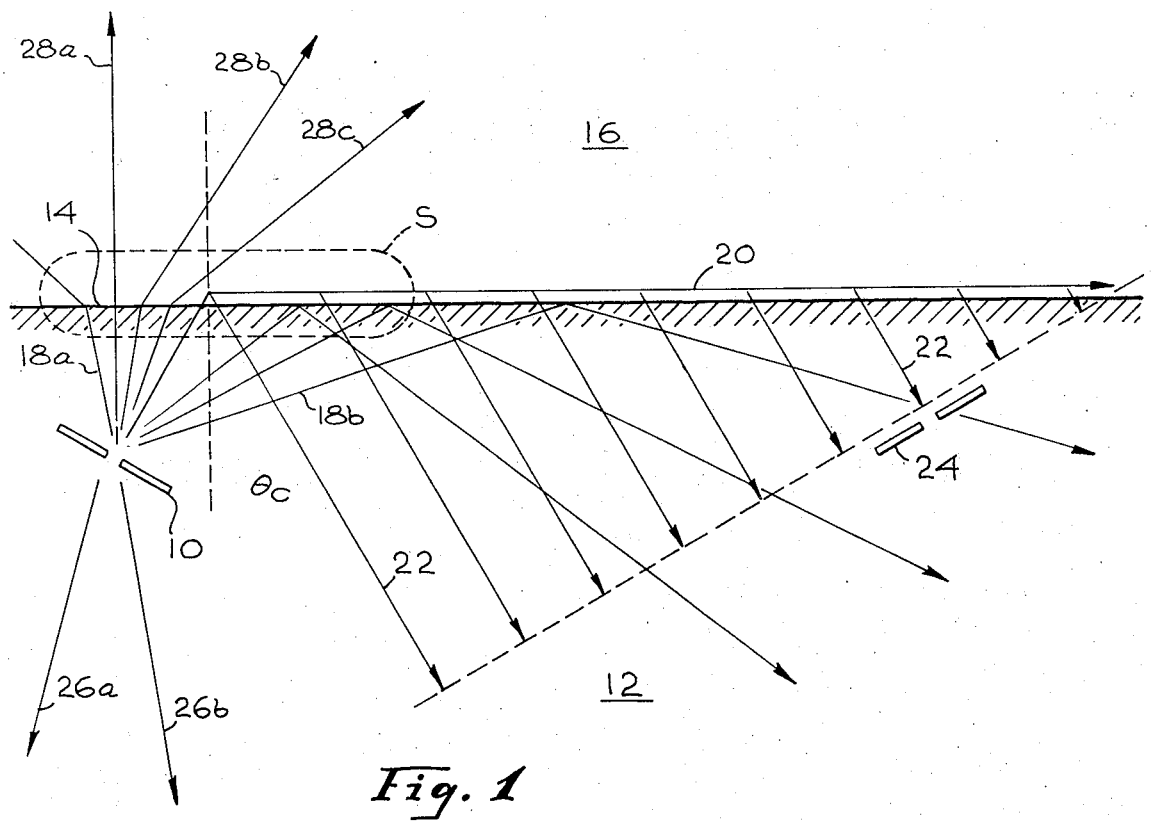
FIG. 1 is a ray diagram showing an arrangement for launching surface waves in accordance with the prior art.

FIG. 1 is a diagram schematically showing the radiation pattern of a surface wave launching system in accordance with the prior art. A radio source such as a dipole 10 is embedded in a refractive medium 12 bounded by a plane interface, 14, which separates it from an upper, less refractive medium 16. By way of illustration, the interface may be considered to be the surface of the earth or the surface of a body of water. The antenna, which by way of illustration is representative of the buried dipole, is tilted so that the maximum of the radiation pattern of the dipole, represented by rays 18A, 18B, is directed in the direction of the critical angle. It will be recalled that the angle of incidence made by a ray from the antenna with the interface, which causes a surface ray, represented by 20, is the critical angle. As the ray propagates tangentially to the interface, it continuously sheds rays 22 into the lower medium and eventually one such ray can be intercepted by a receiving antenna 24 which is also buried in the lower medium.

The rays 26A and B, represent the rays which are radiated down into the earth from the antenna. The rays 28A, B, and C, represent the rays which strike the interface at an angle other than the critical angle and thus are radiated into the atmosphere.

The critical angle is shown on the drawing and is designated as $\theta_C$.

The intensity of the surface wave decreases approximately as 1/R, because of the radial spreading in the plane of the interface and in addition, there is a $(1/R)^2$ decrease in intensity because of the continual shedding of rays into the lower medium. The shed rays can be regarded as filling a conically bounded volume, the lateral area of which increases approximately as $R^2$; thus the total attenuation is the product, $1/R \cdot 1/R^2$ or $1/R^3$.

The system shown in FIG. 1 has been built and tested, using a frequency of 900 MHz and a large box of moist sand as a test range. The buried horizontal dipole has been tested in various positions and configurations and it was found that in all cases it is an inefficient generator of ground wave or surface waves. Dry sand does not improve appreciably the performance of the horizontal dipole. From measurements it is estimated that less than 100th of the energy in such antennas is available as a surface wave.

In accordance with this invention, it was decided to modify the ground or profile in the region of the emergence of subterranian radiation, which is bounded by the dashed line S in FIG. 1. In modifiying the profile of the interface in region S, it is the objective to associate a greater solid angle in the dipole radiation pattern with those rays which emerge parallel to the interface and, equally important, to introduce a longitudinal electric field component.

Figure 2:
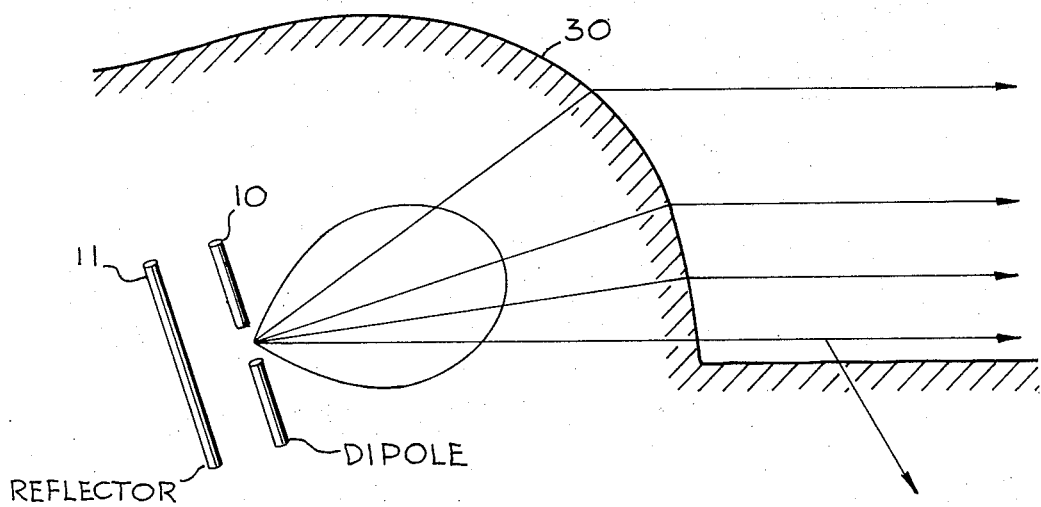
FIG. 2 illustrates an arrangement for shaping the interface region, into a cylindrical lens in accordance with this invention for launching surface waves.

For those cases in which the lower medium is much more refractive than the upper, that is, for a relative dielectric constant of 10 or more, which is typical of the earth's surface or bodies of water, both objectives can be met by shaping the interface in region S into a cylindrical or spherical lens, as shown in FIG. 2.

Because of the high dielectric constant, the wavelength in the lower medium is three or more times smaller than a wavelength in air. Thus, it is possible to design a lens with an aperture that is three or four wavelenghts in size where the wavelengths are measured in the lower medium and still have the aperture of the lens less than one wavelength in size and air. Because of the high dielectric constant, it makes sense to design lens on the basis of geometric optics requiring that all rays incident on the aperture emerge parallel to the planar interface between the two mediums; moreover, since the aperture is smaller than the wavelength in air, and the wave vector is refracted through a large angle at the lens surface, there will be an introduction of an appreciable longitudinal electric field component. It is clear that the aperture of the lens will include a large angular sector of the radiation from the dipole rather than an infinitesimal sector.

FIG. 2 shows a view in section of a cylindrical lens 30 positioned above the antenna 10 so as to intercept a large portion of its radiation pattern for substantial conversion into surface rays. A reflector 11 has been placed behind the antenna 10 to improve efficiency. The manner of designing a cylindrical lens to refract the rays incident thereinto out through its aperture is well known in the art of antenna lens design and thus need not be gone into here. From the diagram of the rays shown as emanating from the dipole 10 it is apparent that the larger part of the radiation from the dipole will be directed out through the aperture of the lens producing a substantial increase in the strength of the surface wave. Less apparent, and the crux of the invention, is the large refraction at the surface of an aperture, small relative to wavelength in air, which introduces the essential longitudinal electric field component.

Figure 3:
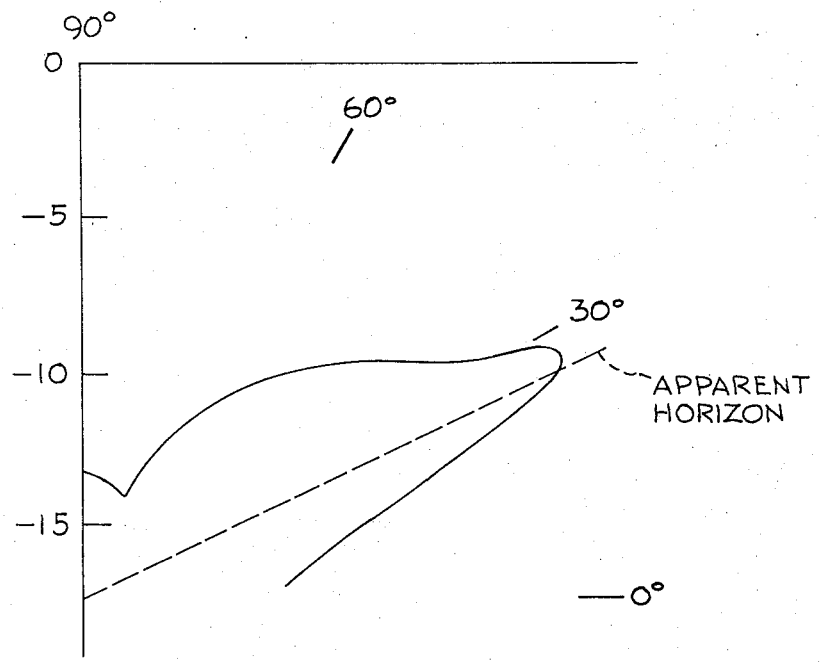
FIG. 3 is a graph of the polar radiation pattern emitted by the arrangement of FIG. 2.

A lens, such as shown in FIG. 2, was formed and tested in a large box of damp sand, FIG. 3 shows the polar radiation pattern detected by the receiving antenna. Because the receiving antenna used for making the measurements was about 12 wavelengths from the cylindrical lens, special consideration is required to interpret the radiation pattern. The upper portion of the pattern resembles the trailing edge of a bird wing and is characteristic of an exponential function displayed in polar coordinates.

Figure 4:
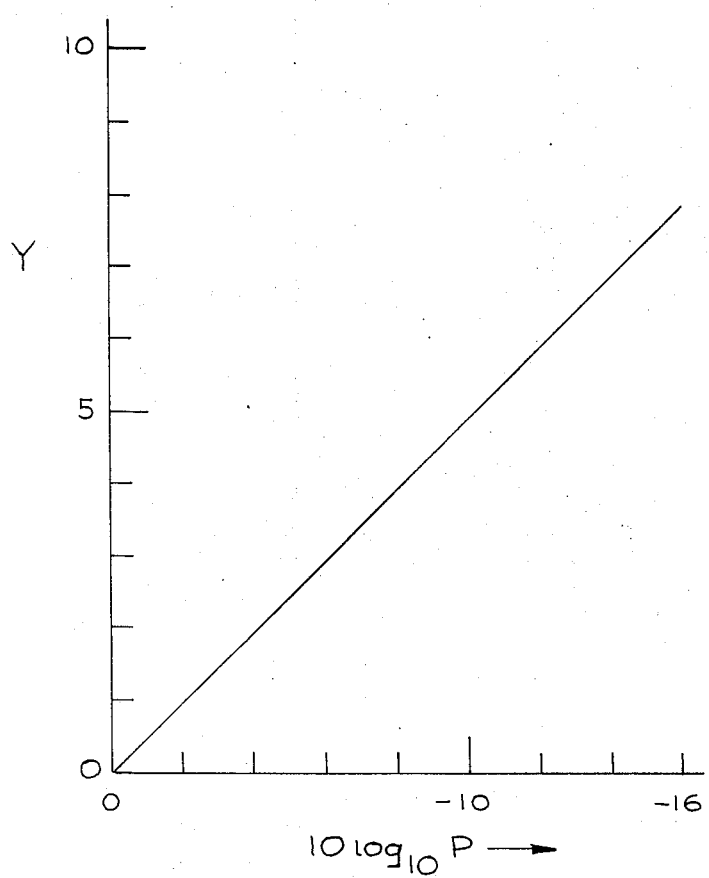
FIG. 4 is a rectangular plot of the radiation pattern shown in FIG. 3.

To further illustrate this, attention is called to FIG. 4 which is a rectangular plot of the radiation pattern and it shows that in rectangular coordinates the measured signal strength, in decibels, lies close to a straight line. The vertical coordinate, $Y = 10\theta$, where $\theta$ is the polar angle, is proportional to height. Since the amplitude of a surface wave decreases exponentially with height, the upper limb of the pattern is characteristic of the surface of guided wave, not a pattern of the sky wave radiation. The interpretation of the pattern is that sky wave radiation is 14 db or more below the maximum at the horizon, which is an indication of an efficient surface wave generator.

The earth-air cylindrical lens constitutes a surface wave launcher in which the aperture amplitude distribution resembles a truncated surface wave function. This occurs because of the null in the vertical direction of the dipole pattern and because of increasing reflection from the lens surface with increasing elevation angle.

This type of aperture distribution has been shown, theoretically, to be optimum for surface wave generation. In the embodiment of the invention which was built, the radius of the lens was about three wave lengths long in the wet sand and was designed to produce a vertical phase front in air. However, the lens aperture is smaller than a wavelength in air and refraction at its surface produces a hotizontal, longitudinal electric field component, characteristic of the surface wave. For this reason the device can be regarded as a mode transducer, from TEM to TM as well as a geometric lens.

Figure 5:
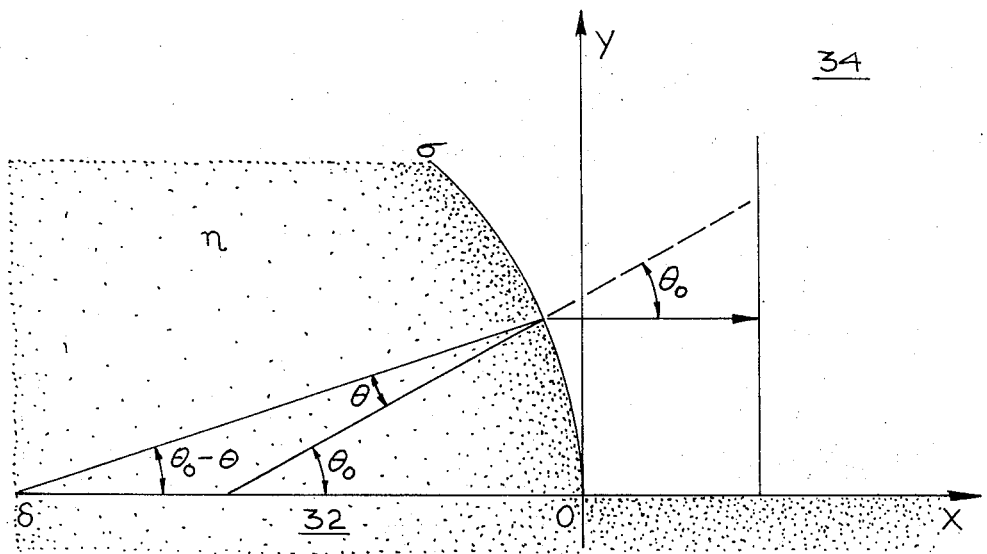
FIG. 5 is an illustration of the geometric design for a cylindrical lens interface, in accordance with this invention.

By way of example, but not by way of a limitation upon the invention, the details of a geometric design for a cylindrical lens interface is shown. FIG. 5 indicates a source at S in a medium 32 of refractive index $\eta$. The medium is separated from free space 34 by a surface $\sigma$. The problem is to find the equation of the surface that produces a refracted wave that is approximately planar and perpendicular to the horizontal surface of the medium.

The refraction at the surface is given by Snell's Law, $$\sin\theta_o = \eta\sin\theta \tag{1}$$

The condition that all points on a plane parallel to the y-axis be equi-phase is $$f(\eta - 1) + \rho[\cos(\theta_o - \theta) - \eta] = 0 \tag{2}$$

where $f$ is the distance from O to S and $\rho$ is a polar coordinate from S to a point on the surface. The relations between the polar and rectangular coordinates are $$x = \rho\cos(\theta_o - \theta) \qquad (3)$$

$$y = \rho\sin(\theta_o - \theta) \qquad (4)$$

Figure 6:
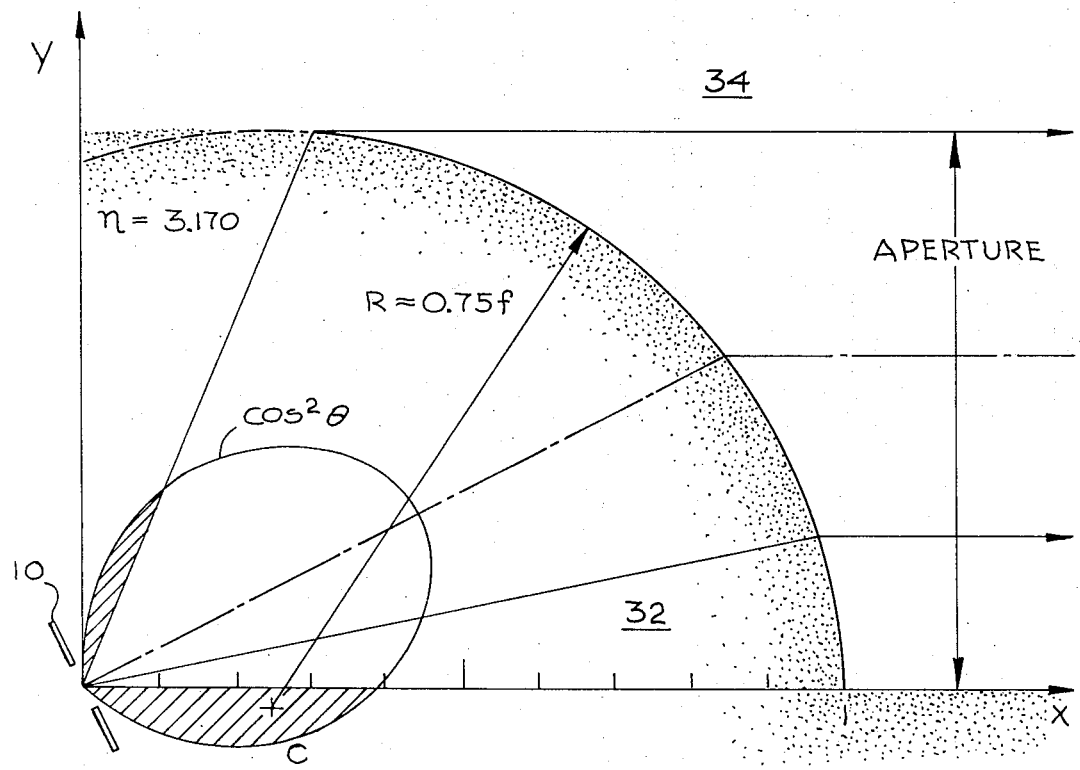
FIG. 6 is a computer solution of the equations for a cylindrical lens which may be used, in accordance with this invention.

A computer solution to the above equations for a relative refractivity of $\eta = 3.170$ is shown in FIG. 6. The surface can be closely approximated by a circle of radius $0.75\ f$.

There has accordingly been described and shown a novel and improved surface wave launching system.

What is claimed is:

1. A system for generating radio surface waves which are propagated along the surface of the earth where it interfaces with the atmosphere comprising:

an antenna embedded in and beneath the surface of the earth and positioned to point the radiation pattern of said antenna in the direction of the critical angle, where said critical angle is the angle of incidence made by a ray from said antenna with the interface plane such that said ray is propagated tangentially to the interface region, and lens means formed in a circular configuration and having an aperture smaller than the wavelength in air of the propagated wave and fashioned of the material of said embedding medium and disposed on top of the surface of said medium over the region at which the maximum of the radiation pattern of said antenna is directed for directing said radiation tangentially to the surface of the earth.

2. A system as recited in claim 1 wherein said lens means is a spherical lens.

3. A system as recited in claim 1 wherein said lens means is a cylindrical lens means.

* * * * *